(12) United States Patent
Yokoya

(10) Patent No.: US 7,128,018 B2
(45) Date of Patent: Oct. 31, 2006

(54) SMALL WATERCRAFT

(75) Inventor: Noboru Yokoya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 10/893,660

(22) Filed: Jul. 16, 2004

(65) Prior Publication Data

US 2005/0039663 A1    Feb. 24, 2005

(30) Foreign Application Priority Data

Aug. 20, 2003   (JP) .............................. 2003-295799

(51) Int. Cl.
     *B63B 5/24*      (2006.01)
(52) U.S. Cl. .......................... 114/357; 440/52; 114/123
(58) Field of Classification Search ................. 114/123, 114/357; 440/52
See application file for complete search history.

(56) References Cited

U.S. PATENT DOCUMENTS 3,130,700 A * 4/1964 Peterson .................... 114/20.1
3,804,292 A * 4/1974 Chiti ......................... 220/88.3
5,050,517 A * 9/1991 Kobayashi .................. 114/123
5,676,088 A * 10/1997 Blaisdell et al. ............ 114/357
5,908,006 A     6/1999 Ibata \* cited by examiner

*Primary Examiner*—Ed Swinehart
(74) *Attorney, Agent, or Firm*—Hamre, Schumann, Mueller & Larson, PC

(57) ABSTRACT

The present invention relates to saddle-riding type watercraft and other small watercraft. In an embodiment, the invention is a small watercraft capable of reducing noise by utilizing the sponson. For example, a small watercraft is provided with a sponson made of synthetic resin, characterized in that within the sponson there has been fixed a weight matched to the frequency of the hull to thereby have a function as a dynamic damper. In an embodiment, the weight is a plate-shaped weight made of metal along the longitudinal direction of the sponson. In an embodiment, the weight is embedded in the sponson along the longitudinal direction thereof.

17 Claims, 3 Drawing Sheets

SMALL WATERCRAFT

FIELD OF THE INVENTION

The present invention relates to saddle-riding type watercraft and other small watercraft.

BACKGROUND OF THE INVENTION

Stiffness of the hull of a small watercraft greatly affects driving noise. Small watercraft are known with a hull having a sponson made of synthetic resin (see, for example, U.S. Pat. No. 5,908,006). However, conventionally, the sponson has made no contribution in respect of reduction in noise because the sponson made of synthetic resin is light-weight and has low stiffness.

Therefore, a need exists for reducing noise by utilizing the sponson.

SUMMARY OF THE INVENTION

In an embodiment according to the present invention, there is provided a small watercraft the hull of which is provided with a sponson made of synthetic resin, characterized in that within the sponson, there has been fixed a weight matched to the frequency of the hull. In an embodiment, the weight is made into a plate-shaped weight along the longitudinal direction of the sponson. In an embodiment, the weight is constructed such that it is embedded in the sponson along the longitudinal direction of the sponson.

DETAILED DESCRIPTION OF THE INVENTION

In an embodiment of a small watercraft according to the present invention, there has been fixed a weight matched to the frequency of the hull (within the sponson made of synthetic resin). Since the sponson made of synthetic resin operates as a spring due to the elasticity of itself, the sponson and the weight can function as a dynamic damper.

Therefore, according to the present invention, it is possible to reduce noise by restraining the vibration of the hull. Also, by utilizing the sponson already provided on the hull, it is possible to reduce the noise by a minimal change without separately providing any dynamic damper. Moreover, since the sponson has been joined with the hull in a surface and the surface restrains vibration of the hull, it is possible to more effectively reduce the noise than attaching a dynamic damper to a vibration point of the hull.

In an embodiment, when the weight has been made into a plate-shaped weight along the longitudinal direction of the sponson, a vibration damping effect due to the improved stiffness itself of the sponson is also obtained and at the same time, another vibration damping effect is obtained over the entire sponson in the longitudinal direction, and therefore, the noise can be more effectively reduced.

In an embodiment, when the weight has been embedded in the sponson along the longitudinal direction thereof, the weight and the sponson are made integral with each other so that the stiffness itself of the sponson is further improved to thereby obtain a vibration damping effect, and at the same time, another vibration damping effect is obtained over the entire sponson in the longitudinal direction, and therefore, the noise can be more effectively reduced.

Figure 1A:
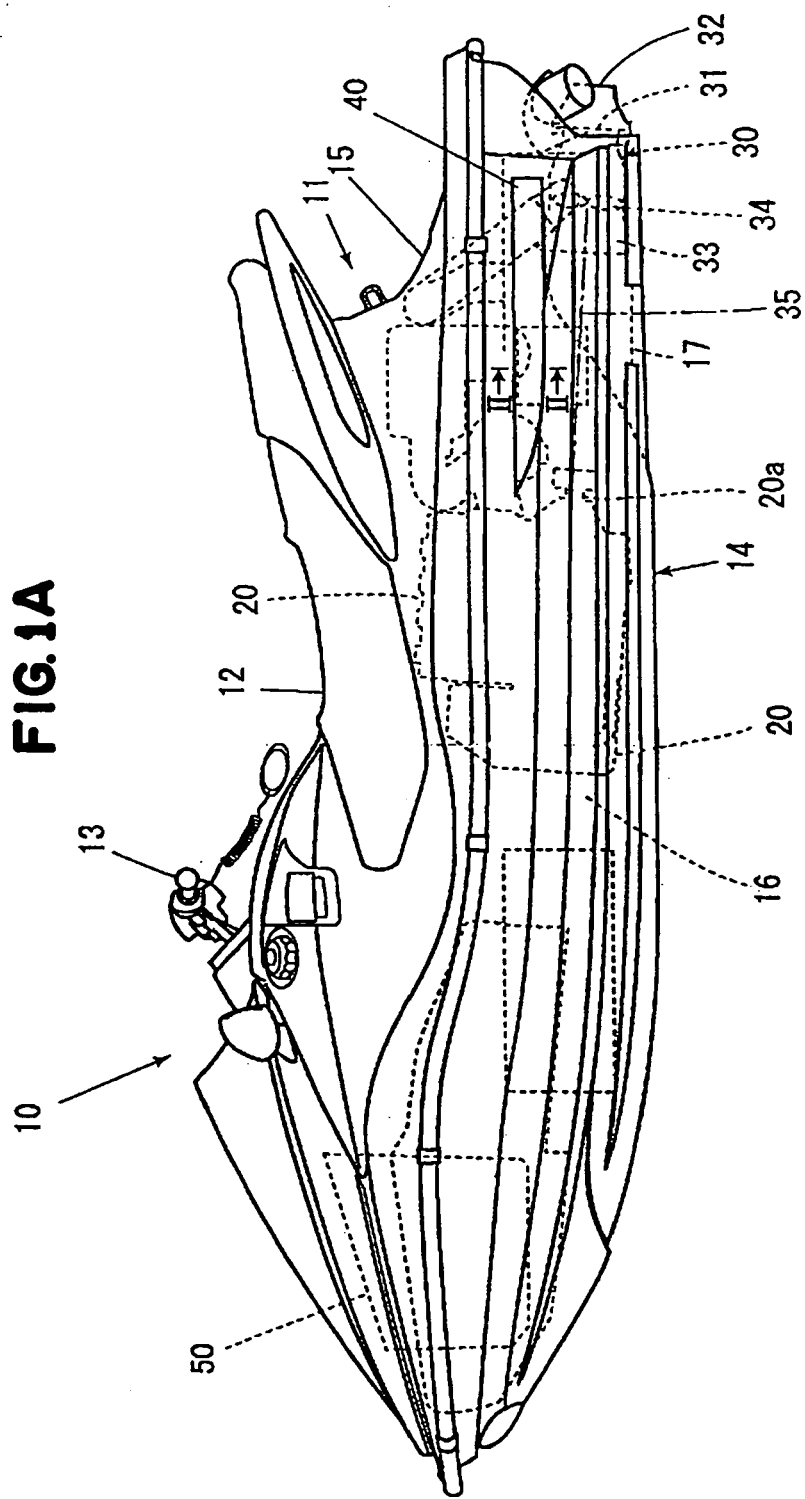
FIG. 1(a) is a side view showing a small watercraft according to an embodiment of the present invention and FIG. 1(b) is a view showing a mode of biquadratic vibration of a hull.

FIG. 1(a) is a side view showing a small watercraft according to an embodiment of the present invention. This small watercraft 10 is a three-seat saddle mounting type small watercraft, and the crew sits on seats 12, on the hull 11, and are capable of navigating by holding a steering wheel (or bar) 13 with a throttle lever.

The hull 11 is of floating body structure in which space 16 is formed within by joining the hull 14 and a deck 15 together. Within the space 16, on the hull 14, there is mounted an engine 20, and a jet pump (jet propulsion pump) 30 as propulsion means to be driven by the engine 20, provided in the rear part of the hull 14.

A jet pump 30 has a main channel 33 reaching from an intake 17 opened in a watercraft's bottom to a jet port 31 opened at a rear end of the hull and a nozzle 32, and an impeller 34 arranged within this channel 33, and a shaft 35 of the impeller 34 is coupled to an output shaft 20a of an engine 20.

Therefore, when the impeller 34 is rotationally driven by the engine 20, water taken in from the intake 17 is jetted through the nozzle 32 from the jet port 31, whereby the hull 11 is propelled. A driving number of revolutions of the engine 20, that is, a propulsion force by the jet pump 30 is operated under rotary control of a throttle lever (not shown) of the steering wheel 13. The nozzle 32 is linked with the steering wheel 13 with an operating wire (not shown), and is rotationally controlled by operating the steering wheel 13, whereby a course can be changed.

On both sides of the hull 14, there are provided the sponsons 40 (in FIG. 1, only the sponson on the left side is shown) made of synthetic resin. Also, in the front part of internal space 16 of the hull 11, there is provided a storage box 50.

FIGS. 2(a) to 2(d) are cross-sectional views taken on line II—II in FIG. 1 respectively, and show sponsons 40 according to respectively different embodiments. In the structure shown in FIG. 2(a), weights 41, 42 are fixed along a longitudinal inner wall surface 40a and an inclined inner wall surface 40b of the sponson 40 respectively. These weights 41, 42 can be fixed by using a bolt with a nut, with adhesive, or with other fastening methods known to those of skill in the art.

Figure 2A:
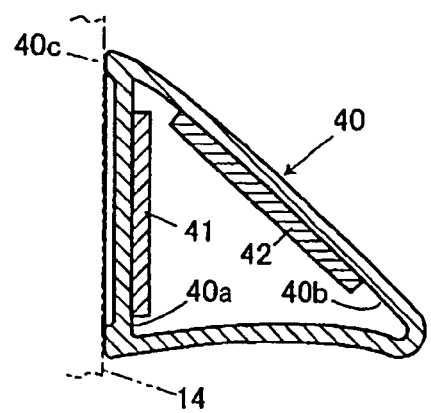
FIGS. 2(a) to 2(d) are cross-sectional views taken on line II—II in FIG. 1 respectively, and show embodiments having respectively different sponsons.
Figure 2B:
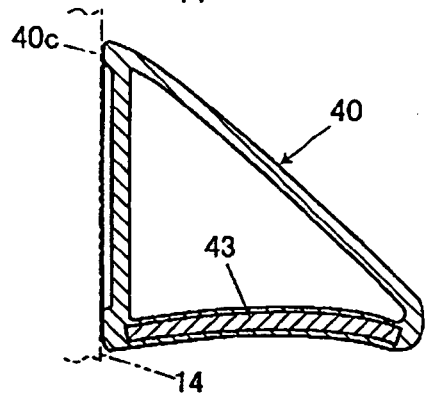
Figure 2C:
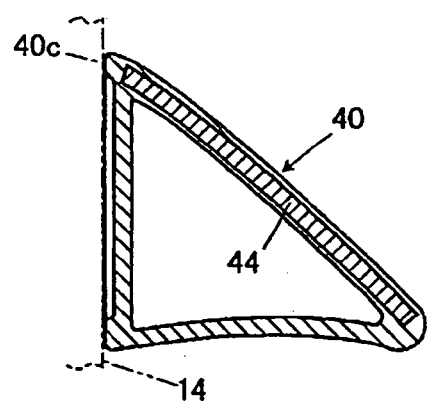
Figure 2D:
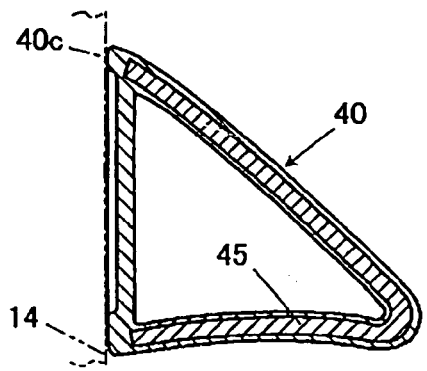

Any of FIGS. 2(b) to 2(d) shows structure in which the weight has been embedded in the sponson 40 by insert-forming, and FIG. 2(b) shows a weight 43 embedded in the base plate portion of the sponson 40, FIG. 2(c) shows a weight 44 embedded in the inclined plate portion, and FIG. 2(d) shows a weight 45 having a substantially V-character shape in cross section embedded in the base plate and the inclined plate portions.

Any of these weights 41 to 45 has weight matched to the frequency of the hull 14 (for reducing the frequency of the hull 14), and is a plate-shaped (or flat-shaped) weight along the longitudinal direction (the left and right direction in FIG. 1) of the sponson 40. These weights 41 to 45 can be constructed of a metal. By way of example, these weights can be constructed of aluminum plate. However, one of skill in the art will appreciate that other metals can also be used.

Figure 1B:
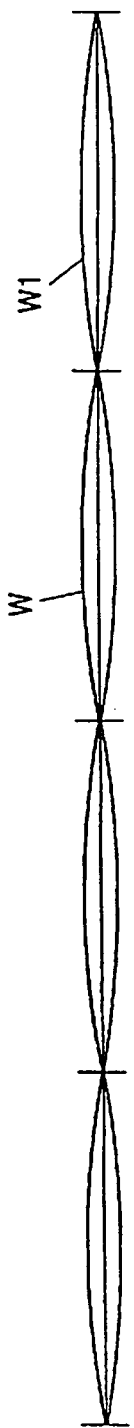

FIG. 1(b) is a view showing a mode of biquadratic vibration of the hull 14. As is apparent from FIGS. 1(a), 1(b), the sponson 40 has been provided at a position which substantially coincides with a position of one W1 of the crests in waveform W of the biquadratic vibration in the longitudinal direction (front to back direction) of the hull 14. Also, as shown in FIG. 1(a), the sponson 40 is provided at a position that substantially coincides with the position of the impeller 34 in the longitudinal direction of the hull 14.

Figure 3A:
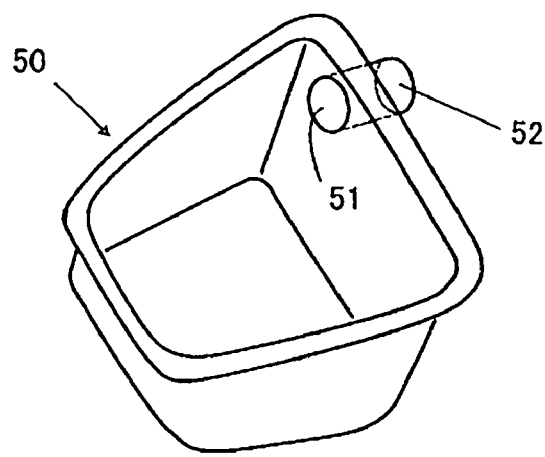
FIGS. 3(a) to 3(c) are perspective views showing a storage box respectively, and show embodiments having respectively different storage boxes.
Figure 3B:
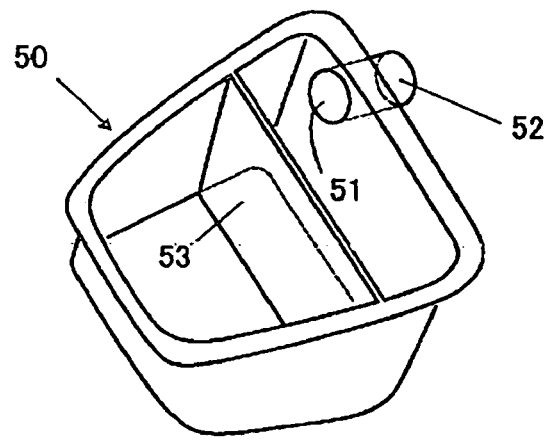
Figure 3C:
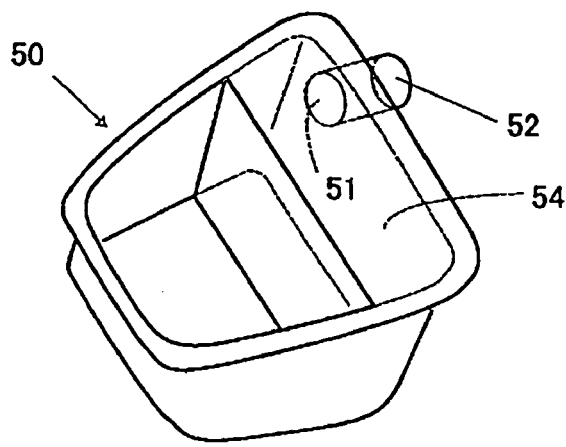

FIGS. 3(a) to 3(c) are perspective views showing a storage box 50 respectively, and show storage boxes according to respectively different embodiments. A feature of these storage boxes 50 is that the storage box 50 has been constructed as a resonator. In order that the storage box 50 may not impair the function as a glove compartment, a hole 51 is bored in an upper corner of the box, a pipe 52 is connected to this hole 51, and diameter and length of the pipe 52 are adjusted to reduce a frequency of noise which is undesirable to the passengers, whereby it is constructed as a Helmholtz type resonator.

Since the upper portion of the storage box 50 has been shielded and the aperture of the pipe 52 faces the internal space 16 of the hull, water cannot enter the storage box 50. The diameter and length of the pipe 52 can be freely set, and depending upon a frequency of noise to be reduced and place of occurrence thereof, the pipe 52 may be extended in the proximity of the place of occurrence.

When objects are put in the storage box 50 and internal space volume of the storage box 50 is changed, the characteristic property as the resonator can be changed. In an embodiment, in order to prevent it, a partition 53 may be provided within the storage box 50 as shown in FIG. 3(b), and a separate chamber 54 may be provided within the storage box 50 as shown in FIG. 3(c) and the pipe 52 may be connected to this separate chamber 54. When the separate chamber 54 has been provided, the pipe 52 can be extended in the proximity of, for example, an intake air device (not shown) of the engine 20 to reduce noise due to the intake air sound by setting the characteristic property of the resonator against the intake air sound. When the separate chamber 54 has been provided, a small hole for water drainage can be provided at the base portion of this separate chamber 54.

In an embodiment of a small watercraft, within the sponson 40 made of synthetic resin, there can be a weight 41 and the like matched to the frequency of the hull 14. As the sponson can be made of synthetic resin and operate as a spring due to the elasticity of itself, the sponson and the weight can exhibit a function as a dynamic damper. Therefore, according to this small watercraft, the noise can be reduced by restraining the vibration of the hull 14.

Also, by utilizing the sponson 40 already provided on the hull 14, it is possible to reduce the noise by a minimal change without separately providing any dynamic damper. Moreover, since the sponson 40 has been joined with the hull 14 on the surface 40c (See FIG. 2) and the surface 40c restrains vibration of the hull 14, it is possible to more effectively reduce the noise than separately attaching a dynamic damper to a vibration point of the hull 14.

In an embodiment, the weight has been made into a plate-shaped weight along the longitudinal direction of the sponson 40 and a vibration damping effect due to the improved stiffness itself of the sponson 40 is obtained and at the same time, another vibration damping effect is obtained over the entire sponson 40 in the longitudinal direction, and therefore, the noise can be more effectively reduced.

In an embodiment, when the weight has been embedded in the sponson 40 along the longitudinal direction thereof (See FIGS. 2(b) to 2(d)), the weight and the sponson are made integral with each other so that the stiffness of the sponson 40 is further improved to thereby obtain a vibration damping effect, and at the same time, another vibration damping effect is obtained over the entire sponson 40 in the longitudinal direction, and therefore, the noise can be more effectively reduced.

In an embodiment, the storage box 50 can be constructed as the resonator and the noise over the entire watercraft can be reduced combined with the vibration damping effect due to the sponson 40.

In the foregoing, a description has been made of the embodiments or examples of the present invention, but the present invention is not limited to the above-described embodiments or examples, and can be appropriately changed in various ways and carried out within the scope of the present invention.

I claim:

1. A watercraft comprising:
   a hull;
   a deck attached to the hull;
   a sponson attached to the hull, the sponson including a wall defining at least a portion thereof, and the sponson is made of synthetic resin; and
   a weight fixed to the wall of the sponson, the weight being matched to a frequency of the hull.

2. The watercraft of claim 1, wherein the weight is embedded within the thickness of the wall of the sponson.

3. The watercraft of claim 1, the weight comprising a plate.

4. The watercraft of claim 1, the weight having a v-shaped cross-section.

5. The watercraft of claim 1, the weight comprising aluminum.

6. The watercraft of claim 1, wherein the watercraft has a capacity of less than four riders.

7. The watercraft of claim 1, further comprising a storage box and a pipe, the hull defining an internal space, wherein the pipe is in fluid communication with the storage box and the internal space.

8. The watercraft of claim 7, the storage box further comprising a partition dividing the storage box into a first portion and a second portion and preventing fluid communication between the first portion and the second portion, wherein the pipe is in fluid communication with the first portion.

9. The watercraft of claim 1, further comprising a jet pump disposed in the hull and comprising an impeller, the hull having a longitudinal axis extending from the stern of the hull to the bow of the hull, wherein the sponson is attached to the hull at a position equal to the position of the impeller along the longitudinal axis.

10. The watercraft of claim 1, wherein the hull produces a biquadratic vibration, wherein the sponson is attached to the hull at a position coinciding with the crest of only one wave of the biquadratic vibration.

11. The watercraft of claim 1, wherein the weight is fixed to an inner surface of the wall.

12. A watercraft comprising:
   a hull;
   a deck attached to the hull;
   a sponson attached to the hull, the sponson including a plurality of walls, and the walls are made of synthetic resin; and a weight fixed to at least one of the walls of the sponson, the weight being matched to a frequency of the hull.

13. The watercraft of claim 12, wherein the weight is embedded within the thickness of one of the walls of the sponson.

14. The watercraft of claim 12, the weight comprising a plate.

15. The watercraft of claim 12, the weight having a v-shaped cross-section.

16. The watercraft of claim 12, wherein the weight is fixed to an inner surface of at least one of the walls.

17. The watercraft of claim 12, wherein the hull produces a biquadratic vibration, wherein the sponson is attached to the hull at a position coinciding with the crest of only one wave of the biquadratic vibration.

* * * * *